S. M. HARRIS.
PLOW.
No. 181,674. Patented Aug. 29, 1876.
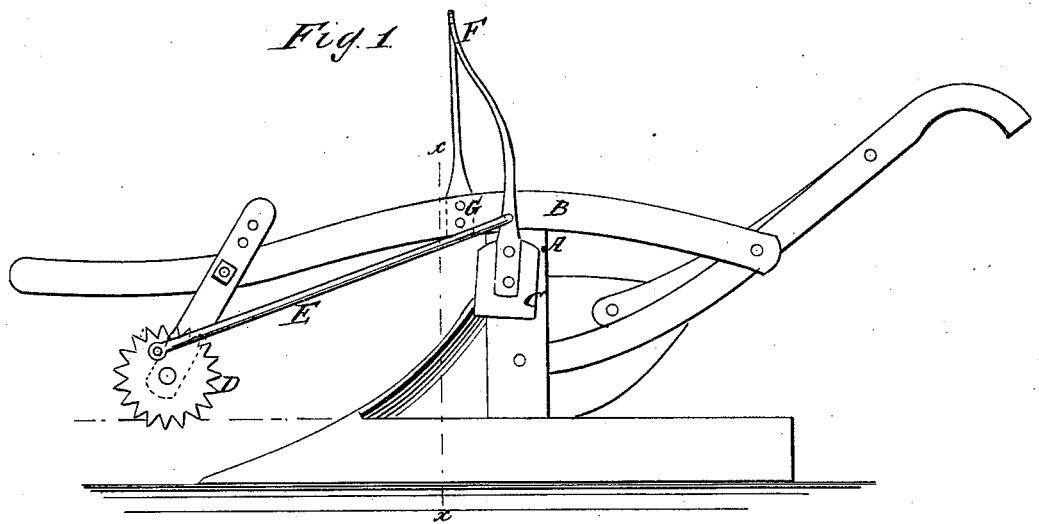
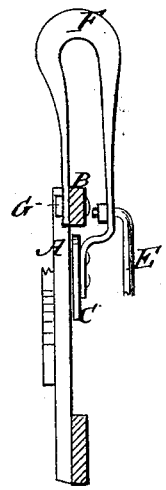
WITNESSES:
INVENTOR:
BY
ATTORNEYS.

UNITED STATES PATENT OFFICE.

STEPHEN M. HARRIS, OF FOREST GROVE, OREGON.

IMPROVEMENT IN PLOWS.

Specification forming part of Letters Patent No. 181,674, dated August 29, 1876; application filed May 16, 1876.

*To all whom it may concern:*

Be it known that I, STEPHEN M. HARRIS, of Forest Grove, in the county of Washington and State of Oregon, have invented new and useful Improvements in Plows, of which the following is a specification:

My invention consists of a clearer for preventing the clogging of the colter or standard, where it is connected with the beam, with stubble, weeds, and the like, the said clearer being a kind of shovel-blade fixed on a spring-support over the beam, so that it can vibrate and couple with a wheel fixed to a support depending from the beam, so as to roll along the ground and work the clearer forward and backward.

Figure 1 is a side elevation of a plow with my improved clearing attachment applied. Fig. 2 is a transverse section taken on the line $x\ x$ of Fig. 1.

Similar letters of reference indicate corresponding parts.

A is the colter or plow standard, between which and the beam B grass, stubble, weeds, &c., clog, so as to interfere seriously with the work. C is the clearing-blade, D the wheel, and E the rod, which I apply to prevent such clogging, the blade being suspended from the bow-shaped spring-support F, bolted to the beam at G, and being made of spring material at the top, to allow the blade to vibrate without a joint. The wheel has teeth to enter the ground sufficiently for traction; but it may be used without teeth, if found practicable, and the clearing-blade may be pivoted to the spring-support F, if preferred.

Having thus described my invention, I claim as new and desire to secure by Letters Patent—

The bow-shaped spring F, carrying the clearer C, in combination with the beam and plow-standard, and geared with a wheel, D, suspended from the beam, substantially as specified.

Witness my hand this 13th day of April, 1876.

STEPHEN M. HARRIS.

Signed in presence of—
S. HUGHES,
J. SWIFT.